United States Patent [19]

Satin

[11] 4,237,170

[45] Dec. 2, 1980

[54] HIGH FIBER WHITE BREAD

[75] Inventor: Morton Satin, Dollard des Ormeaux, Canada

[73] Assignee: Multimarques Inc., Montreal, Canada

[21] Appl. No.: 99,982

[22] Filed: Dec. 3, 1979

Related U.S. Application Data

[63] Continuation-in-part of Ser. No. 920,387, Jun. 29, 1978, abandoned, which is a continuation-in-part of Ser. No. 755,021, Dec. 28, 1976, abandoned.

[51] Int. Cl.³ .............................................. A21D 2/36
[52] U.S. Cl. ................................. 426/21; 426/555; 426/653; 426/804
[58] Field of Search ................... 426/19, 21, 658, 653, 426/804, 920, 387, 555

[56] References Cited

U.S. PATENT DOCUMENTS

| | | | |
|---|---|---|---|
| 3,573,061 | 3/1971 | Glabe et al. | 426/19 X |
| 3,574,634 | 4/1971 | Singer | 426/19 |
| 3,676,150 | 7/1972 | Glicksman et al. | 426/19 |
| 3,767,423 | 10/1973 | Tsantir et al. | 426/804 X |
| 3,979,523 | 9/1976 | Titcomb et al. | 426/19 |
| 4,109,018 | 8/1978 | Thompson | 426/21 X |

FOREIGN PATENT DOCUMENTS

108335  8/1939  Australia .

*Primary Examiner*—Esther M. Kepplinger

[57] ABSTRACT

A high fiber content white bread is prepared by employing as a portion of the conventional dough ingredients, a fiber component obtained from field pea hulls. The result is a unique white bread having an improved fiber content.

12 Claims, No Drawings

HIGH FIBER WHITE BREAD

This is a continuation-in-part of application Ser. No. 920,387 filed June 29, 1978, now abandoned which was a continuation-in-part of application Ser. No. 755,021 filed Dec. 28, 1976 now abandoned.

BACKGROUND OF THE INVENTION

1. Field of the Invention:

This invention relates to food products and more particularly to a high fiber content white bread.

2. Summary of the Prior Art:

Whole wheat is one of nature's better foods for it possesses vitamins, protein, minerals, fats and carbohydrates in proportions that are remarkably well-balanced with a respect to many of man's nutritional needs. If we analyze all of the components of wheat and the factors affecting their utilization, we see the vast potential for bread as virtually an all-inclusive carrier of nutrients. This situation is technologically and sociologically favourable. In terms of economics, it is fundamentally sound, because wheat is among the best of all the cereal grains, and it can be grown in amounts far in excess of that now being produced.

However, a very strong consumer preference has developed for plain white bread. This bread can be made only with the flour milled from that which has up to 30% of the whole grain removed. This has had the effect of removing large amounts of protein as well as various vitamin and mineral constituents. These can be very successfully replenished in a white bread by adding additional protein, vitamin and mineral sources to the bread mix.

Another one of the important ingredients missing from plain white bread, which is present in whole wheat bread, is natural fibers. These natural fibers are biologically active and are highly desirable in foods, serving an important function in human digestion. For instance, they are an important aid to regularity and may be helpful in preventing functional problems associated with the gall bladder, e.g. assist in bringing down the bile acids.

Since white bread can be "enriched" by the addition of sources of missing protein, vitamins and minerals, it would seem obvious that it should also be possible to enrich white bread by the addition of natural fibers. However, the problem is that natural fibers tend to be dark in colour so that these fibers are clearly visible in white bread, giving the appearance of being impurities rather than an integral part of the bread formulation.

Various non-nutritive substances such as cellulose, seed coats, etc., have been used in bread formulations as a portion of the flour. For instance, U.S. Pat. No. 3,573,061, issued Mar. 30, 1971, describes a modified seed coat flour used in the production of a low calorie flour. In U.S. Pat. No. 3,767,423 there is described a flour portion comprised of rice hulls and bean hulls, again for making a low calorie bread. Of course, in being ground to make flour, these seed coats are reduced to a very small particle size of typically about 5 to 25 microns in diameter.

Another non-assimilated carbohydrate material being used in bread is alphacellulose or microcrystalline cellulose. Such a product is described in U.S. Pat. No. 3,023,104 and is sold under the trademark Avicel by the F.M.C. Corporation. This product is now being used commercially in fiber form to produce a so-called high fiber bread. While these purified cellulose materials have the commercial advantage of not interfering with the normal bread making procedure, it is much less certain that they are advantageous to the consumer. They are derived from wood, which is not a traditional food for humans, and recent studies have shown the presence of ingested microcrystalline cellulose fiber in the bloodstream of humans. It is, therefore, by no means certain that these purified cellulose products are a safe additive for baked products, particularly when they are used in large amounts.

It is therefore, the object of the present invention to provide a high fiber white bread in which the fiber content will be both biologically active and compatible in appearance with a baked white bread.

SUMMARY OF THE INVENTION

The present invention provides a white bread product having the aroma and tender eating characteristics of white bread and the capability of being manufactured and distributed in the same manner as conventional white bread while containing fiber components which are compatible in appearance with the bread and which give the bread a greatly improved effective fiber content. According to the invention, a composition for use in the making of high fiber content white bread contains the usual white flour and about 5 to 20 parts by weight based on flour, of pea fibers having particle sizes in the range which pass a 20 mesh screen but do not pass an 80 mesh screen. The pea fibers useful in the invention are obtained from the hulls of yellow or green field peas.

DESCRIPTION OF THE PREFERRED EMBODIMENTS

The bread to which the invention relates may be any conventional bread based on wheat flour, and may be made in any conventional way such as straight dough, sponge and dough, continuous mix and variations thereof. The wheat flour used in the formulation is conventional wheat flour for bread making, and can include blended flour of wheat and other materials. While the dough is referred to herein as bread dough, it will be apparent that the dough is also useful for making buns, rolls and the like.

In preparing a dry mix according to the invention for use in making a high fiber content white bread, the constituents usually present will normally include 100 parts by weight of flour, about 1 to 10 parts of sugar, about 5 to 20 parts by weight of the pea hull fibers and leavening present in an amount sufficient to provide dough expansion. A great many minor ingredients can be employed if desired, to provide optimum performance and to impart special characteristics, although they are not necessary. These may include flavours, egg yolk for tenderizing the dough, emulsifiers which produce tenderness, gluten for the purpose of strengthening the dough and making it more resilient, yeast food, and anti-mycotic agent such as sodium diacetate and colour among others.

A dry mix of the above type may also be prepared in which only part of the final total amount of flour is present, e.g. a mix containing about 5 to 20 parts of the pea hull fibers and 5 to 20 parts of wheat flour, with the balance of the flour being added later.

In one example of a typical formulation including 100 parts commercial baker's flour, the minor ingredients can consist of 3 parts yeast, 2 parts salt, 6 parts sugar, 3 parts shortening and 7 parts pea fiber.

There is, of course, no actual lower limit to the amount of pea fiber that can be employed since any amount of added fiber has some small effect on increasing the fiber content of the bread. However, based upon dietary requirements as well as nutritional requirements that have been carefully gathered from nutritional experts consulted concerning the formulation, about 5 to 20 parts by weight of the fibers is preferred.

The particle size of the fibers used is, on the other hand, very important to the invention. Thus, in order to produce a bread of acceptable commercial quality and which provides an improved fecal output, the particle sizes should be such as to pass a 20 mesh screen but not pass an 80 mesh screen (U.S. Standard Sieve), with −20+60 mesh particles being particularly preferred.

Large quantities of field peas are used for split peas, the preparation of which consists of cleaning and grading, kiln-drying, splitting, and screening out the hulls and chips from the full half peas. It is the hulls obtained from such procedure which are particularly useful in the present invention.

The hulls obtained from field peas of either the yellow or green variety may be used in the invention. Actually, the so-called yellow peas tend to be a light buff color and the hulls have this light buff color. The green field peas, on the other hand, have a kernel which is green in color even after kiln-drying, but the hulls obtained from these dried green peas tend to also be generally light buff in color and are very similar in appearance to the hulls of yellow field peas. Moreover, the characteristics of the finished breads baked with fibers from field peas of the yellow and green varieties are very similar in both chemical and physical properties, so that the fibers from the different varieties may be used either mixed together or separately.

The invention will be better understood by reference to the following Examples wherein values are expressed in parts by weight.

EXAMPLE 1

Tests were conducted on yellow field pea hull fibers from three different sources as follows:

Pea Fiber "A" - Commercial Pea Hulls #05000 Coarse
Pea Fiber "B" - Commercial Pea Hulls Fine
Pea Fiber "C" - Research Pea Hulls "60 mesh"

Standard sieve tests on the above samples give the following results:

TABLE I

| Sieve # | SAMPLE SOURCE | | |
|---|---|---|---|
| | Pea Fiber "A" | Pea Fiber "B" | Pea Fiber "C" |
| #10 | 0.1% | 0.2% | Nil |
| #20 | 26.6 | 2.6 | 0.2 |
| #30 | 37.6 | 1.7 | 0.3 |
| #40 | 20.4 | 4.5 | 0.4 |
| #50 | 7.7 | 24.4 | 0.5 |
| #80 | 7.6 | 26.2 | 20.4 |
| #100 | 1.4 | 8.4 | 9.9 |
| #200 | 2.3 | 17.4 | 31.3 |
| Pan | 2.6 | 14.7 | 37.2 |

Four cuts were made on these samples to obtain the following particle sizes:
(a) +20 mesh
(b) −20+40 mesh
(c) −40+80 mesh
(d) −80 mesh Blends were made of the above pea fiber cuts and commercial baker's flour (Steinberg Special Flour), with 7.5% pea fiber being added to the flour (14% moisture basis). Each of the flour blends prepared was tested on a farinograph to determine peak absorption prior to baking. The following results were obtained.

TABLE II

| Flour Sample | Absorption |
|---|---|
| 1. Steinberg Special Flour (Control) | 69.0% |
| 2. Steinberg Special Flour +7.5% Cut (a) | 72.1% |
| 3. Steinberg Special Flour +7.5% Cut (b) | 72.4% |
| 4. Steinberg Special Flour +7.5% Cut (c) | 72.2% |
| 5. Steinberg Special Flour +7.5% Cut (d) | 70.8% |

BAKING TESTS

Breads were baked using the above four blends and the control sample. The baking tests were run in quadruplicate and the following general formula was used:

TABLE III

| INGREDIENT | % ON FLOUR BASIS |
|---|---|
| Flour | — |
| $H_2O$ | Variable (see Farinograph tests) |
| Yeast | 3% |
| Salt | 2% |
| Sugar | 6% |
| Shortening | 3% |
| Pea Fiber | 7.5% |

A sponge and dough method was used. The doughs were mixed to maximum consistency, divided in 500 gms, rounded and given a 20 minute intermediate proof. They were then moulded and deposited into 16 oz. pans. The doughs were proofed to ¾" above the pan and then baked for 25 minutes at 425° F.

The doughs showed a tendency to be somewhat sticky and slack and required an additional 10 to 15 minutes to proof.

The breads were tested analytically with the following results:

TABLE IV

| Flour Sample | ANALYTICAL TESTS | | | | | Colour (Hunter units) | | |
|---|---|---|---|---|---|---|---|---|
| | Mois-ture | Fat | Protein | Ash | Fiber | L | a | b |
| 1 | 36.7 | 1.2 | 8.7 | 0.93 | 0.2 | 74.2 | −.8 | 14.0 |
| 2 | 38.0 | 0.74 | 8.3 | 0.79 | 2.1 | 71.7 | −.4 | 14.3 |
| 3 | 37.8 | 1.0 | 8.3 | 0.83 | 2.0 | 71.2 | −.1 | 14.7 |
| 4 | 36.8 | 1.0 | 8.6 | 1.1 | 2.1 | 72.0 | −.3 | 14.5 |
| 5 | 37.3 | 0.96 | 9.1 | 0.94 | 0.43 | 66.1 | +.6 | 14.6 |

LOAF VOLUMES AND BREAD SCORES

Bread volumes were measured within 10 minutes of removing the loaves from the oven. The results are averages of quadruplicate baking tests.

TABLE V

| LOAF VOLUME | |
|---|---|
| Flour Sample | Volume |
| 1 | 2625 c.c |
| 2 | 2255 c.c. |
| 3 | 2355 c.c. |
| 4 | 2365 c.c. |
| 5 | 2105 c.c. |

The baked loaves were then evaluated by 3 experts to determine bread scores. The scores and major defects are given as follows:

TABLE VI

| Flour Sample | BREAD SCORE Score | Defects |
|---|---|---|
| 1 | 98 | Uneven grain. |
| 2 | 84 | Uneven grain, some large holes, crumb is yellowish, texture slightly rough, slight off flavour |
| 3 | 86 | Uneven grain, some large holes, crumb is yellowish, slight off flavour. |
| 4 | 97 | Greyish, slight unpleasant aftertaste |
| 5 | 71 | No shred, open and thick cells, uneven grain, large holes, yellowish crumb, off odor and off flavour. |

The scores were based on a maximum of 100 and any very minor defects evident only to an expert were noted. A score of 85 or better is considered to be a good, acceptable bread with a score of 90–95 representing excellent quality.

EXAMPLE 2

A second series of breads were baked using as the fiber component a material obtained from sugar beet pulp. This was a dried product obtained by drying the pulp left after extraction of the sugar component from sugar beets. It was used in a particle size similar to the pea hull −20+40 mesh fraction.

The baking tests were run using the following formula:

TABLE VII

| INGREDIENT | % ON FLOUR BASIS |
|---|---|
| Flour | — |
| H$_2$O | 72% |
| Yeast | 3% |
| Salt | 2% |
| Sugar | 6% |
| Shortening | 3% |
| Sugar Beet Pulp | 7.5% |

The sponge and dough method was used. The dough was mixed to maximum consistency, divided in 500 gms, rounded and given a 20 minute intermediate proof. They were then moulded and deposited into 16 oz. pans. The doughs were proofed to ¾" above the pan and then baked for 25 minutes at 425° F.

EXAMPLE 3

A first series of rat fecal volume trials were undertaken to determine which particle size at 7.5% addition resulted in the maximum fecal volume. The tests were conducted by MacDonald Campus of McGill University, Montreal.

The tests were conducted using the four breads of Example 1 using the flour—pea fiber blends. Under the same conditions, Purina Rat Chow, bread containing 7.5% AVICEL 591, a double bran bread, whole wheat bread, white bread and the bread of Example 2 were tested. Each trial lasted five days and the fecal output for that time was measured.

In two separate trials, adult female rats (Sprague-Dawley strain) were offered the different breads for two consecutive 5-day periods as the sole source of feed. Water was offered ad libitum. During both periods all breads were offered at the rate of 14 g (air dry basis) per rat, per day. Feed refused, if any, was measured daily. All breads had the crust removed and were dried (65.6° C., 24 hours) and ground (1 mm screen) prior to feeding. The Purina (commercial) Rat Chow was ground and fed as a control diet.

Feces were collected daily for the second 5-day period and dried (75° C., 48 hours). Fecal volume was estimated after drying by placing the feces in a volumetric cylinder.

The results obtained were as follows:

TABLE VIII

| Food | 5-day Fecal Output(dry) |
|---|---|
| Bread (7.5% +20 mesh pea fiber) | 10.2 ml |
| Bread (7.5% −20 + 40 mesh pea fiber) | 12.0 ml |
| Bread (7.5% −40 + 80 mesh pea fiber) | 9.7 ml |
| Bread (7.5% −80 mesh pea fiber) | 8.7 ml |
| Bread (7.5% AVICEL 591) | 10.5 ml |
| Double Bran Bread | 33.0 ml |
| Purina Rat Chow | 42.0 ml |
| Whole Wheat Bread | 18.0 ml |
| White Bread | 6.7 ml |
| Bread (7.5% beet pulp) | 12.0 ml |

EXAMPLE 4

Following the same procedure as in Example 1, three breads were baked using 5%, 10% and 15% of the −20+40 mesh pea fiber fraction. These were fed to rats under the same conditions as in Example 3 and the following results were obtained:

TABLE IX

| Bread | 5-day Fecal Output(dry) |
|---|---|
| 5% pea fiber | 10.8 ml |
| 10% pea fiber | 16.5 ml |
| 15% pea fiber | 18.5 ml |

EXAMPLE 5

In order to show the quality of field pea hull fibers over other fiber sources in bread products, comparative trials were conducted using microcrystalline cellulose (MCC), sugar beet pulp, malt hulls, yellow field pea hulls, alfalfa and wheat bran as the fiber components.

The same procedures were used as shown in Examples 1 to 4 and the various sources of fiber used in the study are shown in Table X. The bread was baked with a conventional sponge and dough method using the same conditions as shown in Example 1 and in all cases the fiber was added at the dough stage. Table XI indicates the basic formula used in the preparation of the breads.

A brabender Faringograph (300 g bowl) was used to determine water absorption, mixing time and tolerances for all doughs. These results are shown in Table XII.

The chemical and physical properties of the various breads produced were determined, including moisture, protein, crude fiber and crumb color. The crumb color was determined with a Hunterlab color difference meter calibrated with a standard white tile. Crude fiber was determined by the AACC method. These chemical and physical properties of the various breads are shown in Table XIII.

Loaf volumes and overall score for the various breads were also determined and these are shown in Table XIV.

The results of the rat feeding trials carried out in the same manner as set out in Example 3 are shown in Table XV.

The results show that only a selected particle size range of pea hulls could give the desired results. For instance, looking at Table XII it will be seen that both MCC and beet pulp showed a significant and undesirable increase in water absorption when fiber was added as compared with pea hulls. The beet pulp, pea hulls, alfalfa and bran all increased the time required to reach mixing peak but all had a satisfactory mixing tolerance. Pea hulls through 80 mesh and malt hulls both exhibited short mixing times and tolerance.

In the crumb color evaluations shown in Table XII, MCC and pea hulls were very similar to the control. All other breads were darker with beet pulp and alfalfa both exhibiting unacceptably low crumb color.

As will be seen from Table XIV, the total scores showed wide variations for the different breads with beet pulp, pea hulls through 80 mesh and alfalfa all being well below the generally accepted minimum score of approximately 85. The main deficits were in color and taste on standing. Thus, the breads made with sugar beet pulp darkened on standing and also developed an unacceptable taste. The breads made with alfalfa scored very poorly in crumb color and the breads made with through 80 mesh pea hulls exhibited uneven grain, yellowish crumb, off odor and off flavour.

The results of the rat feeding trials in Table XV showed the pea hulls to have an apparent dry matter digestibility which compared very favorably with whole wheat bread and this is highly desirable. It will be noted from these results that MCC gave a very high fecal density which is not desirable.

Of the naturally light coloured fiber tested, only the pea hull fibers having particle sizes in the range −20+80 mesh exhibited the characteristics necessary to produce a white bread having the digestive characteristics of whole wheat bread, while having a satisfactory colour and taste on standing.

TABLE X

SOURCES OF FIBER USED IN STUDY

| Source | Moisture % | Crude Fiber % |
|---|---|---|
| *MCC | 4.6 | 54.3 |
| Sugar Beet Pulp | 4.1 | 20 |
| **Pea Hulls (on 20 mesh) | 7.9 | 41.2 |
| Pea Hulls (20–40 mesh) | 8.8 | 39.9 |
| Pea Hulls (40–80 mesh) | 8.2 | 45.2 |
| Pea Hulls (through 80 mesh) | 8.8 | 35.3 |
| Malt Hulls | 5.4 | 7.3 |
| Wheat Bran | 8.8 | 10.6 |
| Alfalfa | 6.7 | 24.5 |

*Avicel 591
**from *Pisum sativum*

TABLE XI

BASIC BREAD FORMULA

| INGREDIENT | SPONGE | DOUGH |
|---|---|---|
| Unbleached Flour | 450 | 200 |
| H$_2$O | 270 | 210 (± as required) |
| Yeast | 13 | 6.5 |
| Salt | | 13 |
| Sugar | | 39 |
| Shortening | | 19.5 |
| Fiber Source | | 48.5 |
| TOTAL | 733 | |

TABLE XII

FARINOGRAPH RESULTS FOR THE VARIOUS DOUGHS

| DOUGH | ABSORPTION (%) | TIME TO MIXING PEAK (min) | MIXING TOLERANCE (min) |
|---|---|---|---|
| Control | 68.3 | 3 | 12 |
| MCC | 80 | 3.5 | 14.5 |
| Beet Pulp | 77 | 8 | 17 |
| Pea Hulls (on 20 mesh) | 72.1 | 8 | 10.5 |
| Pea Hulls (20–40 mesh) | 72.4 | 8 | 8.5 |
| Pea Hulls (40–80 mesh) | 72.2 | 7 | 9 |
| Pea Hulls (through 80 mesh) | 70.8 | 4 | 4 |
| Malt Hulls | 64.8 | 1.5 | 4.5 |
| Alfalfa | 71.6 | 5.5 | 8 |
| Wheat Bran | 68.6 | 6.0 | 20 |

TABLE XIII

THE CHEMICAL AND PHYSICAL PROPERTIES OF THE VARIOUS BREADS

| BREAD | MOISTURE % | PROTEIN % | CRUDE FIBER % | CRUMB COLOUR L | a | b* |
|---|---|---|---|---|---|---|
| Control | 36.2 | 8.3 | 0.2 | 75.2 | −.2 | 15 |
| MCC | 38.7 | 7.7 | 3.1 | 74 | −.3 | 15 |
| Beet Pulp | 39.8 | 7.7 | 1.3 | 60.4 | 1.0 | 13 |
| Pea Hulls (on 20 mesh) | 37.9 | 8.3 | 2.1 | 72.1 | −.4 | 14.1 |
| Pea Hulls (20–40 mesh) | 37.8 | 8.3 | 2.0 | 71.0 | 0 | 14.8 |
| Pea Hulls (40–80 mesh) | 36.8 | 8.6 | 1.9 | 71.7 | −.3 | 14.5 |
| Pea Hulls (thru 80 mesh) | 37.3 | 9.1 | — | 66.0 | .7 | 14.7 |
| Malt Hulls | 35.4 | 8.2 | 0.81 | 65.9 | .6 | 15.0 |
| Alfalfa | 38.0 | 8.6 | 1.5 | 49.8 | −1.9 | 17.5 |
| Bran | 36.8 | 8.5 | 1.0 | 69.5 | 1.4 | 14.5 |

*L = Lightness
green - a + red
blue - b + yellow

TABLE XIV

LOAF VOLUME AND OVERALL SCORE OF VARIOUS BREADS

| BREAD | LOAF VOLUME (cc) | TOTAL SCORE |
|---|---|---|
| Control | 2350 | 97 |
| MCC | 1900 | 84 |
| Beet Pulp | 1975 | 75 |
| Pea Hulls (on 20) | 2000 | 84 |
| Pea Hulls (20–40) | 2100 | 86 |
| Pea Hulls (40–80) | 2100 | 97 |
| Pea Hulls (thru 80) | 1850 | 71 |
| Alfalfa | 2200 | 75 |
| Malt Hulls | 2200 | 82 |
| Bran | 2125 | 88 |

TABLE XV

RESULTS OF RAT FEEDING TRIALS

| BREAD | DAILY INTAKE (g/rat) | 5-DAY FECAL OUTPUT wt (g/rat) | 5-DAY FECAL OUTPUT vol (ml/rat) | APPARENT DRY MATTER DIGESTIBILITY % | FECAL DENSITY (g/ml) |
|---|---|---|---|---|---|
| Rat Chow | 13.9 | 16.3 | 42.0 | 76.5 | .388 |
| MCC | 14.0 | 7.3 | 10.5 | 89.6 | .695 |
| Control | 12.7 | 2.0 | 6.7 | 97.0 | .299 |
| Beet Pulp | 12.4 | 4.0 | 12.0 | 94.0 | .333 |
| Pea Hulls (On 20) | 14.0 | 5.5 | 10.2 | 92.1 | .539 |
| Pea Hulls (20/40) | 14.0 | 5.3 | 12.0 | 92.4 | .442 |
| Pea Hulls | 13.8 | 4.5 | 9.7 | 93.5 | .464 |

TABLE XV-continued

RESULTS OF RAT FEEDING TRIALS

| BREAD | DAILY IN-TAKE (g/rat) | 5-DAY FECAL OUTPUT wt (g/rat) | 5-DAY FECAL OUTPUT vol (ml/rat) | APPARENT DRY MATTER DIGESTIBILITY % | FECAL DENSITY (g/ml) |
|---|---|---|---|---|---|
| (40/80) Pea Hulls (thru 80) | 13.9 | 4.3 | 8.7 | 93.8 | .494 |
| Alfalfa | 13.0 | 3.3 | 14.8 | 95.0 | .223 |
| Malt Hulls | 10.8 | 2.8 | 8.4 | 94.8 | .333 |
| Whole Wheat (60%) | 12.4 | 4.7 | 13.3 | 92.4 | .353 |
| Whole Wheat (100%) | 12.7 | 5.2 | 18.1 | 92.0 | .287 |

EXAMPLE 6

Following the same procedure as in Example 1, breads were baked using 7.5% and 11% of pea hull fibers having a light buff color obtained from a green variety of field peas and also 7.5% pea hull fibers obtained from a yellow variety of field peas. The fiber used had particle sizes in the −20+80 mesh range.

The breads obtained were tested analytically with the following results:

| Sample | Fat | Protein | Ash | Crude Fiber | Color (Hunter Units)* L | a | b |
|---|---|---|---|---|---|---|---|
| 7.5% Yellow Hulls | 0.94 | 14.5 | 2.88 | 31.76 | 76.7 | −0.6 | +17.0 |
| 7.5% Green Hulls | 1.03 | 14.5 | 2.91 | 31.68 | 75.6 | −1.2 | +18.3 |

*L - scale of 1 to 100
a - scale of −100 to +100
b - scale of −100 to +100

Farinograph results for the various doughs were as follows:

| Dough | Absorption (%) | Time to Mixing Peak (min) | Mixing Tolerance (min) |
|---|---|---|---|
| 7.5% Yellow Hulls | 71.2 | 6½ | 8.75 |
| 7.5% Green Hulls | 70.8 | 6 | 10.5 |

Loaf volume and overall score of various breads were also determined with the following results:

| Bread | Loaf Volume (cc) | Total Score |
|---|---|---|
| 7.5% Yellow Fibers | 2117 | 80 |
| 7.5% Green Fibers | 2183 | 81 |

The bread samples were fed to rats under the same conditions as in Example 3 and the following results were obtained:

TABLE XVI

| BREAD | DAILY IN-TAKE (g/rat) | 5-Day FECAL OUTPUT wt (g/rat) | 5-Day FECAL OUTPUT vol (ml/rat) | APPARENT DRY MATTER DIGESTIBILITY % | FECAL DENSITY (g/ml) |
|---|---|---|---|---|---|
| 7.5% green pea fiber | 13.8 | 4.9 | 13.6 | 92.9 | .360 |
| 7.5% yellow pea fiber | 14.0 | 5.3 | 12.0 | 92.4 | .442 |
| 11% green pea fiber | 14.1 | 6.2 | 19.85 | 91.2 | .312 |

The above results as directly compared for green and yellow pea hull fibers are for practical purposes identical within normal experimental error and, moreover, the results compare very closely with the results for yellow pea hull fibers shown in Table XV.

As a further comparison between pea hull fibers from yellow and green field peas, trace metal profiles were compared for the above varieties of pea hull fibers as well as for other fibers used in breads. These results are given in Table XVII below:

TABLE XVII

TRACE METAL ANALYSIS OF VARIOUS FIBER INGREDIENTS
TRACE METAL (IN PARTS PER MILLION)

| INGREDIENT | MAGNESIUM | ZINC | PHOSPHORUS | IRON | SODIUM | POTASSIUM | COPPER | CADMIUM | SELENIUM | CHROMIUM |
|---|---|---|---|---|---|---|---|---|---|---|
| WHEAT BRAN | 4506 | 61.8 | 2936 | 40.7 | 37.0 | 7787 | <5 | <3 | <1 | <3 |
| YELLOW PEA HULLS | 2546 | 40.3 | 1259 | 65.9 | 28.4 | 8791 | <5 | <3 | <1 | <3 |
| GREEN PEA HULLS | 2121 | 37.4 | 1586 | 52.7 | 30.4 | 10421 | <5 | <3 | <1 | <3 |
| SOYA HULLS | 962 | 20.3 | 543 | 130.0 | 517.0 | 775 | <5 | <3 | <1 | <3 |
| RICE HULLS | 330 | 9.2 | 306 | 68.1 | 33 | 2142 | <5 | <3 | <1 | <3 |

The above results show that the trace metal profiles for the two varieties of field pea fibers compare very closely to each other and both are much closer to the profile of wheat bran than are soya hulls or rice hulls.

I claim:

1. A composition for use in making a high fiber content white bread comprising 100 parts by weight flour and about 5 to 20 parts by weight field pea hull fibers having particle sizes in the range which pass a 20 mesh screen but do not pass an 80 mesh screen, said pea hulls being selected from the group consisting of yellow and green pea hulls and mixtures thereof.

2. The composition of claim 1 wherein the field pea hull fibers are obtained from the hulls of green field peas.

3. A composition for use in making a high fiber content white bread comprising 100 parts by weight flour and about 5 to 20 parts by weight yellow field pea hull fibers having particle sizes in the range which pass a 20 mesh screen but do not pass an 80 mesh screen.

4. The composition of claim 1 wherein the pea fibers will not pass a 60 mesh screen.

5. The composition of claim 1 wherein the pea fibers will pass a 20 mesh screen but not pass a 40 mesh screen.

6. A dry mix for use in making a high fiber content white bread, said dry mix comprising:
100 parts by weight of commercial baker's flour,
about 1 to 10 parts by weight sugar,
about 5 to 20 parts by weight yellow field pea hull fibers having particle sizes in the range which pass a 20 mesh screen but do not pass an 80 mesh screen, and leavening agent.

7. The composition of claim 6 wherein the pea hull fibers have particle sizes which pass a 20 mesh screen but do not pass a 60 mesh screen.

8. A dry mix for use in making a high fiber content white bread, said dry mix comprising:

100 parts by weight of commercial baker's flour, about 1 to 10 parts by weight sugar, about 5 to 20 parts by weight green field pea hull fibers having particle sizes in the range which pass a 20 mesh screen but do not pass an 80 mesh screen, and leavening agent.

9. In the method of making baked products of the yeast leavening type from wheat flour wherein a dough formulation is mixed, fermented, kneaded, shaped and baked; the improvement comprising the addition to said dough formulation of yellow field pea hull fibers having particle sizes in the range which pass a 20 mesh screen but do not pass an 80 mesh screen, said fibers being added in an amount of 5 to 20 parts by weight per 100 parts by weight of wheat flour.

10. In the method of making baked products of the yeast leavening type from wheat flour wherein a dough formulation is mixed, fermented, kneaded, shaped and baked; the improvement comprising the addition to said dough formulation of green field pea hull fibers having particle sizes in the range which pass a 20 mesh screen but do not pass an 80 mesh screen, said fibers being added in an amount of 5 to 20 parts by weight per 100 parts by weight of wheat flour.

11. A yeast leavened baked product comprising 100 parts by weight of flour, sugar and 5 to 20 parts by weight field pea hull fibers having particle sizes in the range which pass a 20 mesh screen but do not pass an 80 mesh screen, said pea hulls being selected from the group consisting of yellow and green pea hulls and mixtures thereof.

12. A dry mix for use in making baked products of the yeast leavened type from wheat flour wherein a dough formulation is mixed, fermented, kneaded, shaped and baked, and wherein field pea hull fibers are added to said dough formulations in an amount of 5-20 parts by weight per 100 parts by weight of wheat flour, said mix comprising the entirety of said 5 to 20 parts of said pea hull fibers and from about 5 to 20 parts of the wheat flour, the pea hull fibers having particles in the range of which pass a 20 mesh screen but do not pass an 80 mesh screen and the pea hulls being selected from the group consisting of yellow and green field pea hulls and mixtures thereof.

* * * * *